United States Patent
Usuya et al.

(10) Patent No.: US 10,043,620 B2
(45) Date of Patent: Aug. 7, 2018

(54) SWITCH DEVICE

(71) Applicants: KABUSHIKI KAISHA TOKAI RIKA DENKI SEISAKUSHO, Aichi (JP); TOYOTA JIDOSHA KABUSHIKI KAISHA, Aichi-ken (JP)

(72) Inventors: Tadashi Usuya, Aichi (JP); Yasuaki Nadaya, Aichi-ken (JP); Tadashi Okubo, Aichi-ken (JP); Shigeo Shigeyama, Aichi-ken (JP); Toshihiko Kosugi, Aichi-ken (JP)

(73) Assignees: KABUSHIKI KAISHA TOKAI RIKA DENKI SEISAKUSHO, Aichi-Ken (JP); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 15/052,396

(22) Filed: Feb. 24, 2016

(65) Prior Publication Data

US 2016/0247647 A1 Aug. 25, 2016

(30) Foreign Application Priority Data

Feb. 25, 2015 (JP) .................. 2015-035191

(51) Int. Cl.
*H01H 25/06* (2006.01)
*B62D 1/16* (2006.01)
(Continued)

(52) U.S. Cl.
CPC ......... *H01H 25/065* (2013.01); *B60Q 1/1461* (2013.01); *B62D 1/16* (2013.01); *H01H 25/008* (2013.01)

(58) Field of Classification Search
CPC ........ H01H 25/065; H01H 25/06; B60S 1/08; B60Q 1/14; B60Q 1/1461
(Continued)

(56) References Cited

U.S. PATENT DOCUMENTS

| 2004/0262135 A1* | 12/2004 | Sugimoto | .............. B60Q 5/003 200/61.54 |
| 2005/0205399 A1* | 9/2005 | Baba | ................... B60Q 1/1469 200/61.54 |

FOREIGN PATENT DOCUMENTS

| CN | 1577669 A | 2/2005 |
| EP | 0082997 A1 | 7/1983 |

(Continued)

OTHER PUBLICATIONS

Extended European Search Report for corresponding European Patent Application No. 16156828.2 dated Jul. 21, 2016.
(Continued)

*Primary Examiner* — Renee S Luebke
*Assistant Examiner* — Iman Malakooti
(74) *Attorney, Agent, or Firm* — Roberts Mlotkowski Safran Cole & Calderon P.C.

(57) ABSTRACT

A switch device includes a switch body that supports a lever operating portion, and a cylindrical fitting portion through which the switch body is attached to an attached portion. The fitting portion includes a plurality of elastic deformation portions elastically deformable by a clamping force of a clamping band member and a pressed-bulging portion bulging from an outer surface of a tip portion of the elastic deformation portions. The pressed-bulging portion is configured to locate at a contact position with the attached portion.

7 Claims, 5 Drawing Sheets

(51) Int. Cl.
*B60Q 1/14* (2006.01)
*H01H 25/00* (2006.01)

(58) Field of Classification Search
USPC .................................................. 200/61.54
See application file for complete search history.

(56) References Cited

FOREIGN PATENT DOCUMENTS

| | | |
|---|---|---|
| JP | 2003137049 A | 5/2003 |
| JP | 2005-267947 A | 9/2005 |

OTHER PUBLICATIONS

Office Action issued in a corresponding Japanese Patent Application No. 2015-035191 dated Feb. 28, 2017.
Chinese Patent Application No. 201610099574.8 Office Action, dated Jul. 3, 2017 and English translation thereof.
Office Action issued in the corresponding European Patent Application No. 16156828.2 dated Feb. 9, 2018.
Office Action issued in the corresponding Chinese Patent Application No. 201610099574.8 dated Feb. 11, 2018.

\* cited by examiner

SWITCH DEVICE

The present application is based on Japanese patent application No. 2015-035191 filed on Feb. 25, 2015, the entire contents of which are incorporated herein by reference.

BACKGROUND OF THE INVENTION

1. Field of the Invention

The invention relates to a switch device and, in particular, to a switch device provided with operating levers.

2. Description of the Related Art

One example of switch device provided with an operating lever(s) is a switch device which is attached, via a case (hereinafter, referred to as "switch body"), to an outer surface of a column post attached to a vehicle body (see e.g. JP-A-2005-267947).

The switch device disclosed in JP-A-2005-267947 is configured such that switch contacts inside the switch body are electrically connected or disconnected by performing an operation on operating levers which are swingably attached to both ends of the switch body.

A cylinder portion extending downward is formed in the middle portion of the switch body. Plural elastic locking pieces having a protruding locking portion on the inner surface and plural elastic contact pieces having a mountain-shaped protrusion throughout the longitudinal direction on the outer surface are formed on the outer peripheral surface of the cylinder portion.

The locking portions of the elastic locking pieces on the cylinder portion of the switch body are engaged with retaining recesses formed on an outer periphery of a supporting column (hereinafter, referred to as "column post"), the elastic locking pieces and the elastic contact pieces are then pressed from the outer side by tightening using a band-shaped highly elastic metal ring, and the operating levers are thereby attached to the column post via the switch body.

SUMMARY OF THE INVENTION

The switch device is configured such that the elastic locking pieces and the elastic contact pieces on the cylinder portion of the switch body are fixed to the column post by a clamping force of the ring. Thus, if attachment strength to attach the switch body varies, it is difficult to maintain the attachment strength when receiving an overload which is greater than the setting of the operating levers.

It is an object of the invention to provide a switch device that reduces a variation in the attachment strength thereof.

(1) According to an embodiment of the invention, a switch device comprises:

a switch body that supports a lever operating portion; and a cylindrical fitting portion through which the switch body is attached to an attached portion, wherein the fitting portion comprises a plurality of elastic deformation portions elastically deformable by a clamping force of a clamping band member and a pressed-bulging portion bulging from an outer surface of a tip portion of the elastic deformation portions, and wherein the pressed-bulging portion is configured to locate at a contact position with the attached portion.

In the above embodiment (1) of the invention, the following modifications and changes can be made.

(i) The fitting portion comprises a notch as a vertical slit formed on a circumferential wall, and wherein the elastic deformation portions are each sandwiched between two of the notch.

(ii) The attached portion comprises a column post rotatably supporting a steering shaft of a vehicle.

(iii) An inner surface of the pressed-bulging portion is configured to contact the attached portion by tightening by an annular member from outside.

(iv) The pressed-bulging portion is configured to have a thickness greater than that of a base portion of the elastic deformation portions.

Effects of the Invention

According to an embodiment of the invention, a switch device can be provided that reduces a variation in the attachment strength thereof.

BRIEF DESCRIPTION OF THE DRAWINGS

Next, the present invention will be explained in more detail in conjunction with appended drawings, wherein.

DETAILED DESCRIPTION OF THE PREFERRED EMBODIMENTS

A preferred embodiment of the invention will be specifically described below in conjunction with the appended drawings.

Configuration of Switch Device

Figure 1:
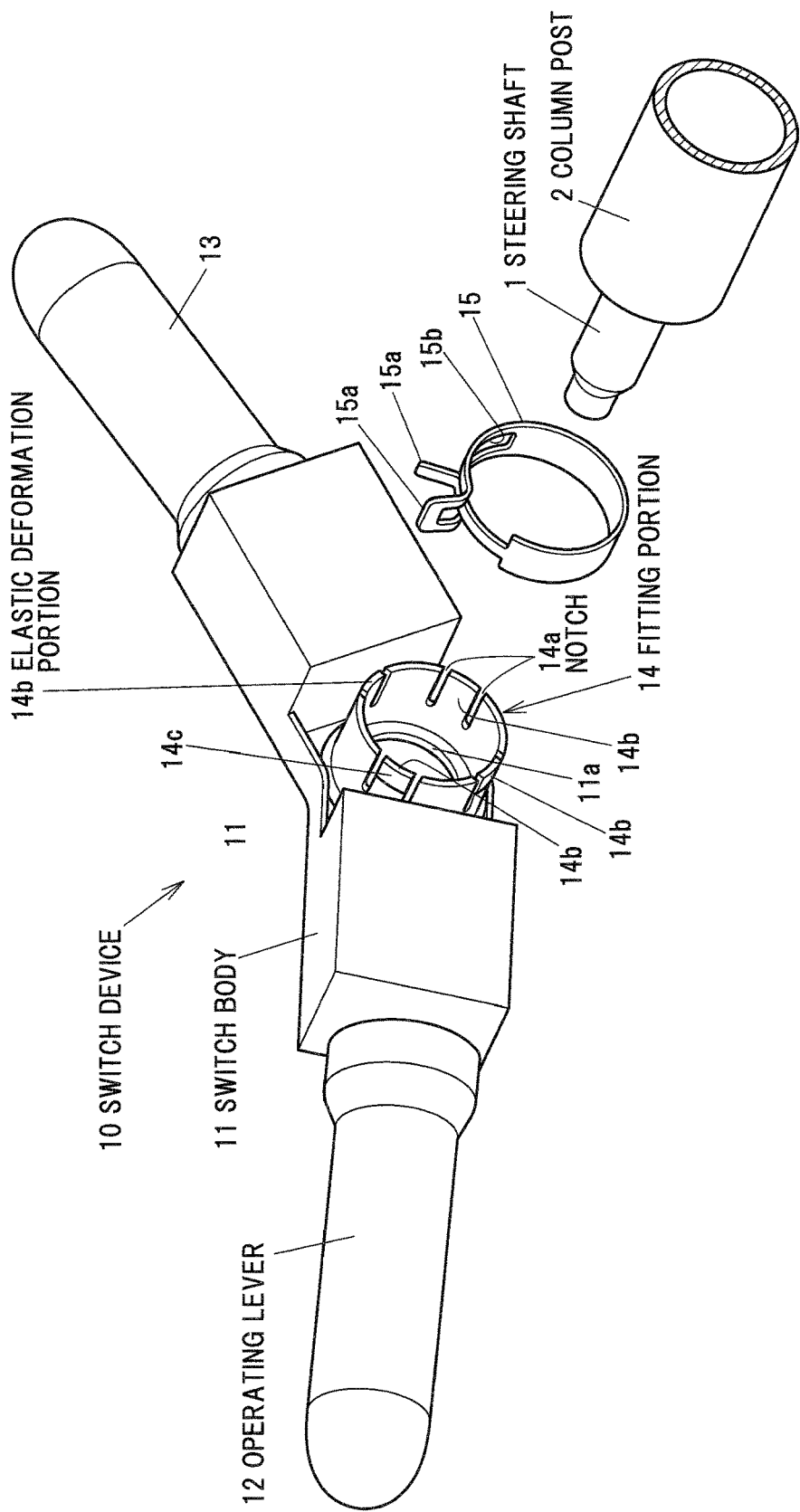
FIG. 1 is an explanatory schematic exploded perspective view showing a switch device in a preferred embodiment of the present invention.

FIG. 1 schematically shows a typical switch device in the present embodiment which is indicated generally by the reference numeral 10. The switch device 10 is attached to the outer periphery of a column post 2 which rotatably supports a steering shaft 1 of a vehicle.

The switch device 10 has a switch body 11 with built-in switches for various vehicle devices such as turn signal lamps, headlamps, fog lamps, windshield wipers and washer.

The switch body 11 is formed of a resin material with a box shape. A pair of operating levers 12 and 13 swingably operated in up-and-down and back-and-forth directions of the vehicle are attached, as a combination lever switch, to right and left sides of the switch body 11.

The left operating lever 12 is a wiper switch to operate windshield wipers and a washer, etc., which are turned on/off corresponding to an operation performed on the operating lever 12 when the state of switch contacts (not shown) inside the switch body 11 is changed by operating the operating lever 12.

The right operating lever 13 is a lamp switch to operate turn signal lamps, headlamps and fog lamps, etc., which are turned on/off corresponding to an operation performed on the operating lever 13 when the state of switch contacts (not shown) inside the switch body 11 is changed by operating the operating lever 13.

Figure 2:
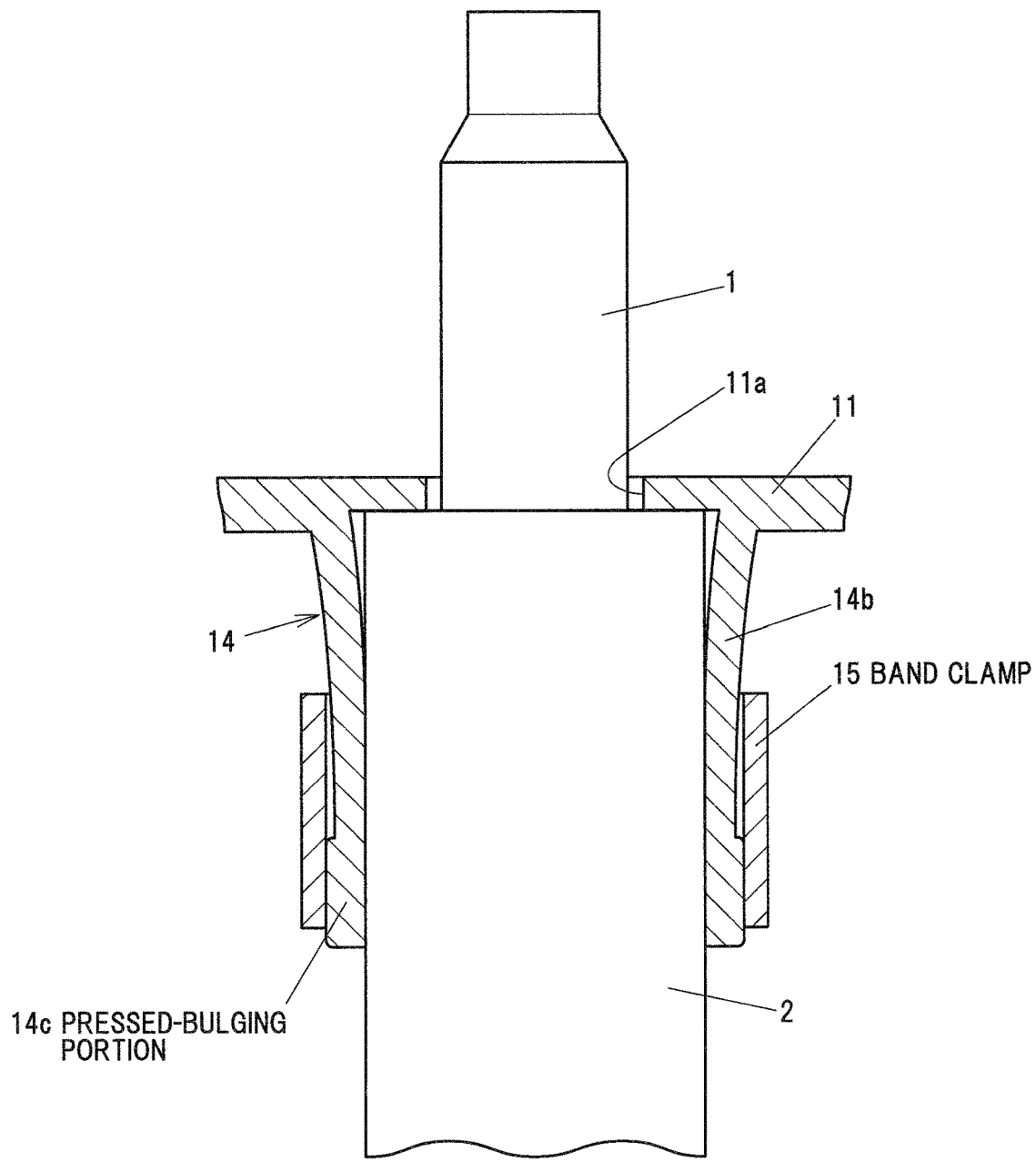
FIG. 2 is a schematic cross sectional view showing a main portion of the switch device in the embodiment.

As shown in FIGS. 1 and 2, the switch device 10 is fitted onto the column post 2 in a state that the steering shaft 1 is inserted through an insertion hole 11a formed to penetrate the middle portion of the switch body 11. A cylindrical fitting portion 14 for fitting the switch body 11 to the column post 2 is formed on a lower side of the switch body 11 around an opening end face of the insertion hole 11a.

The fitting portion 14 of the switch device 10 extends in an axial direction and a circumferential wall thereof is divided by vertical slit-shaped notches 14a so as to have four elastic deformation portions 14b. Each elastic deformation portion 14b allows the diameter of the fitting portion 14 to be reduced when an external force is applied radially inward to the fitting portion 14, thereby facilitating racially inward elastic deformation thereof.

A band clamp 15 for fixing the switch body 11 to the column post 2 is attached to the outer peripheral wall of the fitting portion 14 of the switch body 11. The band clamp 15 is formed of, e.g., a ring-shaped spring plate made of an elastic metal material.

The band clamp 15 is not limited to that in the illustrated example as long as it is a clamping band member generating a pressing force directed radially inward of the fitting portion 14. The band clamp 15 in the illustrated example has protruding pieces 15a formed at both ends of the spring plate and a cutout hole 15b allowing the protruding pieces 15a to move in the circumferential direction when the diameter of the band clamp 15 is enlarged or reduced.

The fitting portion 14 of the switch body 11 is firmly clamped to the column post 2 by the band clamp 15 and the switch body 11 is thereby fixed to the column post 2 in a state that vertical movement and rotation are restricted.

Attachment Structure of Switch Body

The switch device 10 is attached to the column post 2 by a clamping force of the band clamp 15. However, if the band clamp 15 is not in contact with the right points on the fitting portion 14 of the switch body 11, it is difficult to stably support the switch body 11 on the column post 2.

Therefore, it is important that contact points coming into contact with the band clamp 15 be provided on the fitting portion 14 of the switch body 11 in order to improve attachment strength to withstand an overload by the operating levers 12 and 13.

Figure 3:
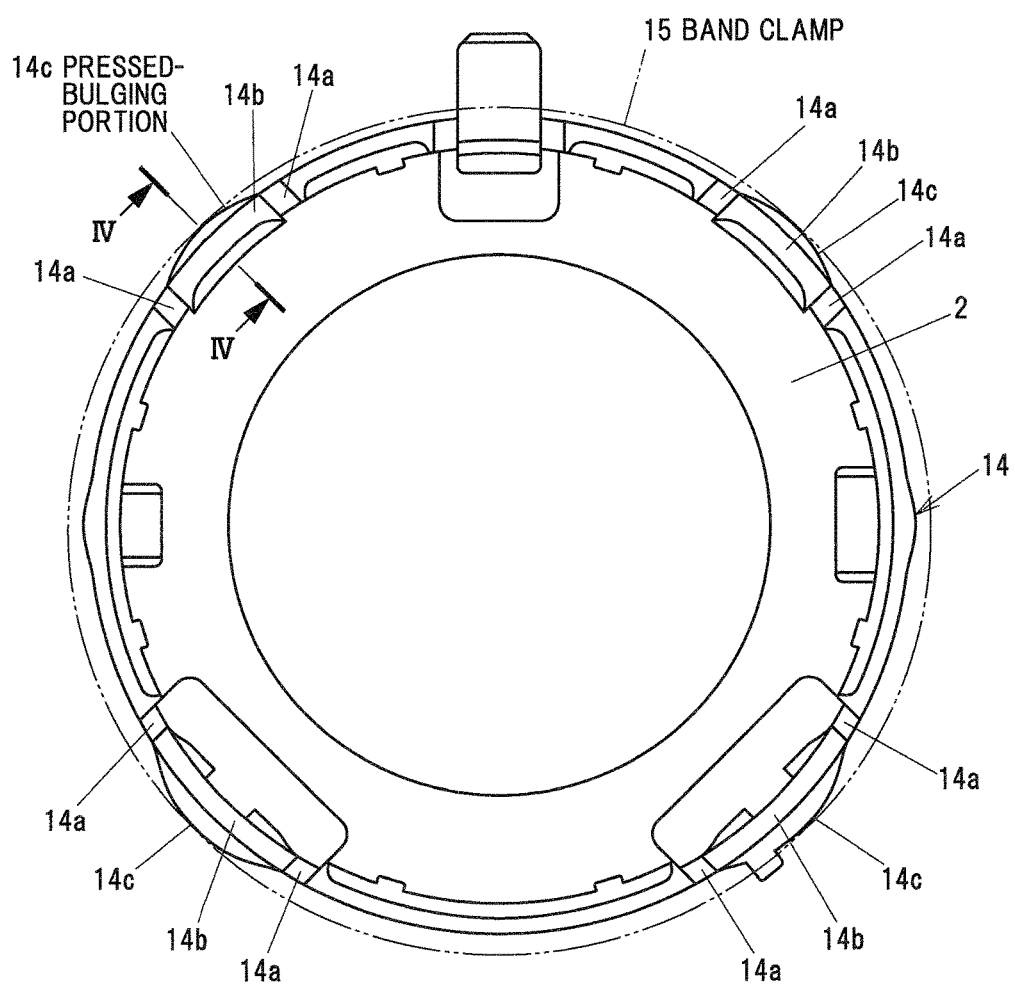
FIG. 3 is a schematic plan view showing the main portion of the switch device in the embodiment.
Figure 4:
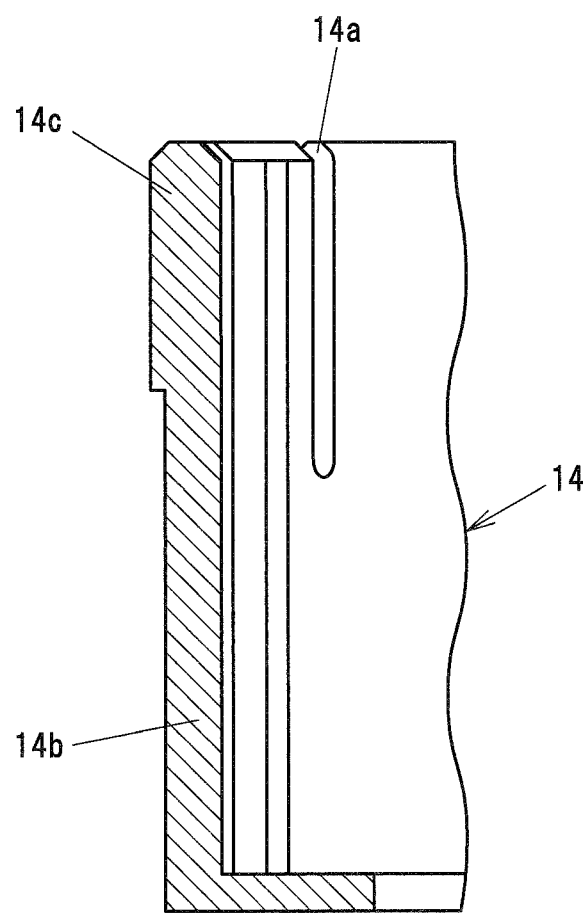
FIG. 4 is a schematic cross sectional view showing the main portion taken on line IV-IV of FIG. 3 and as viewed in an arrow direction.

The main feature of the switch device 1 configured as described above is a structure of the fitting portion 14 of the switch body 11. As shown in FIGS. 3 and 4, the fitting portion 14 has pressed-bulging portions 14c each of which bulges into a curved shape from an outer surface of the tip portion of the elastic deformation portion 14b and is formed thicker than the base portion of the elastic deformation portion 14b. The pressed-bulging portion 14c is configured as a contact region with the column post 2 and maintains the contact with the column post 2 by means of the clamping force of the band clamp 15.

The pressed-bulging portion 14c is configured to continuously apply an elastic repulsive force to the band clamp 15 in a state of being pressed radially inward with the base portion of the elastic deformation portion 14b as a fixed support and of being in contact with the column post 2, and a force in a clamping direction of the band clamp 15 is increased by the elastic repulsive force of the pressed-bulging portion 14c. Thus, fastening power of the band clamp 15 is ensured by elastic deformation of the elastic deformation portions 14b and the contact between the pressed-bulging portions 14c and the column post 2.

This allows the tight contact of the column post 2 with the pressed-bulging portions 14c to be maintained even when a force separating the column post 2 from the pressed-bulging portions 14c acts thereon. Since it is possible to maintain the contact between the pressed-bulging portions 14c and the column post 2, the clamping force of the band clamp 15 is stabilized without variation. As a result, it is possible to reliably maintain attachment strength of the switch body 11 even when an overload greater than the setting of the operating levers 12 and 13 acts thereon.

Although the elastic deformation portions 14b in the illustrated example are arranged on the circumferential wall formed of a resin material so as to be sandwiched between the vertical slit-shaped notches 14a, it is not limited thereto. The elastic deformation portions 14b may be sandwiched between, e.g., thin portions.

In the illustrated example, the switch body 11 is provided with the pressed-bulging portions 14c formed on the outer surfaces of the tip portions of the elastic deformation portions 14b of the fitting portion 14. Additionally, the switch body 11 may also have, e.g., a structure in which recesses or protrusions formed on the inner wall of the fitting portion 14 are engaged with protrusions or recesses formed on the outer periphery of the column post.

Figure 5A:
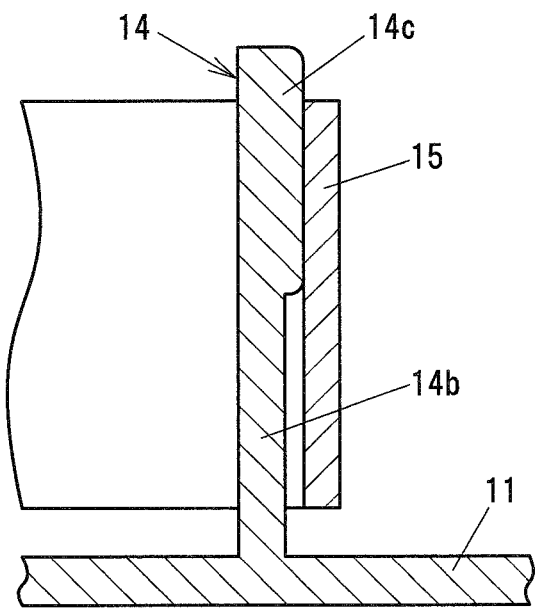
FIG. 5A is a schematic cross sectional view showing the main portion to explain the attached state of a switch body of the switch device in the embodiment.
Figure 5B:
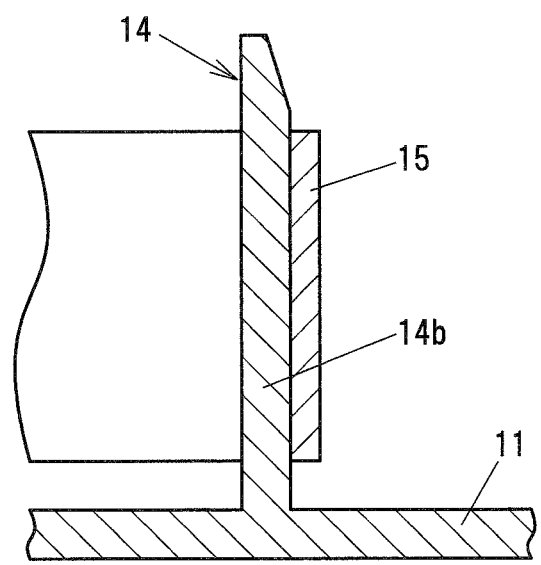
FIG. 5B is a schematic cross sectional view showing the main portion to explain the attached state of a conventional switch body.

Now referring to FIGS. 5A and 5B, the attached state of the switch body 11 in the present embodiment is illustrated in FIG. 5A and the attached state of the switch body 11 with a conventional structure is illustrated in FIG. 5B.

In the present embodiment shown in FIG. 5A, the pressed-bulging portion 14c is formed on the elastic deformation portion 14b of the fitting portion 14 of the switch body 11. In this configuration, the inner surface of the pressed-bulging portion 14c comes into contact with the column post 2 due to diameter reduction caused by the clamping force of the band clamp 15. Large stress also acts on the base portion of the elastic deformation portion 14b. Therefore, the elastic deformation portion 14b deforms with the base portion thereof as a fixed support so as to curve radially inward, and the contact between the pressed-bulging portion 14c and the column post 2 is maintained reliably.

On the other hand, in the conventional technique shown in FIG. 5B, the pressed-bulging portion 14c is not formed on the elastic deformation portion 14b of the fitting portion 14 of the switch body 11. Unlike the elastic deformation portion 14b having the pressed-bulging portion 14c, the base portion of this elastic deformation portion 14b is the contact point with the band clamp 15 and elastic deformation of the elastic deformation portion 14b is restricted. The fitting portion 14 is less likely to curve radially inward with the base portion of the elastic deformation portion 14b as a fixed support and the clamping force of the band clamp 15 decreases, hence, not preferable.

Effects of the First Embodiment

The switch device 1 configured as described above exerts the following effects, in addition to the effects described above.

The contact point on the elastic deformation portion 14b to be in contact with the band clamp 15 is the tip portion, not the base portion. Therefore, it is possible to increase a hold length to be held on the column post 2 of vehicle and it is thus possible to increase attachment strength when the switch body 11 is attached to the column post 2.

Since strength when attached to the column post 2 can be increased by ensuring the fastening power of the band clamp 15, feeling of lever operation can be also improved.

Although a combination lever switch for car has been described in the embodiment and the illustrated example, it is not limited thereto. The invention is applicable to a switch device provided with various operating levers.

In addition, although the switch device 1 is applied to a car in the embodiment and illustrated example, it is not limited thereto. It is obvious that the invention can be effectively applied to, e.g., various vehicles such as construction machineries and agricultural machineries.

Although the typical embodiment and illustrated example of the invention have been described, it is obvious from the above description that the invention according to claims is not to be limited to the embodiment and illustrated example. Therefore, it should be noted that all combinations of the features described in the embodiment and illustrated example are not necessary to solve the problem of the invention.

What is claimed is:

1. A switch device, comprising:
    a switch body that supports a lever operating portion; and
    a cylindrical fitting portion through which the switch body is attached to an attached portion,
    wherein the fitting portion comprises a plurality of elastic deformation portions elastically deformable by a clamping force of a clamping band member and a pressed-bulging portion bulging from an outer surface of a tip portion of the elastic deformation portions, and
    wherein the pressed-bulging portion is configured to be always in contact with the attached portion while being sandwiched between the clamping band member and the attached portion in a radial direction of the cylindrical fitting portion.

2. The switch device according to claim 1, wherein the fitting portion comprises a notch as a vertical slit formed on a circumferential wall, and
    wherein the elastic deformation portions are each sandwiched between two of the notch.

3. The switch device according to claim 1, wherein the attached portion comprises a column post rotatably supporting a steering shaft of a vehicle.

4. The switch device according to claim 1, wherein an inner surface of the pressed-bulging portion is configured to contact the attached portion by tightening by an annular member from outside.

5. The switch device according to claim 1, wherein the pressed-bulging portion is configured to have a thickness greater than that of a base portion of the elastic deformation portions.

6. The switch device according to claim 1, wherein an outside of the pressed-bulging portion contacts with the clamping band member, and an inside of the pressed-bulging portion contacts with the attached portion.

7. The switch device according to claim 1, wherein at least most of the press-bulged portion is covered by the clamping band member.

* * * * *